United States Patent
Black, Sr. et al.

(10) Patent No.: US 7,382,248 B2
(45) Date of Patent: Jun. 3, 2008

(54) TRACKING SYSTEM

(75) Inventors: John J. Black, Sr., Newton, PA (US); James T. Dowdy, Warminster, PA (US)

(73) Assignee: Retriever Industries LLC, Verona, WI (US)

( * ) Notice: Subject to any disclaimer, the term of this patent is extended or adjusted under 35 U.S.C. 154(b) by 299 days.

(21) Appl. No.: 11/358,155

(22) Filed: Feb. 21, 2006

(65) Prior Publication Data

US 2006/0189326 A1 Aug. 24, 2006

Related U.S. Application Data

(60) Provisional application No. 60/654,235, filed on Feb. 18, 2005, provisional application No. 60/654,236, filed on Feb. 18, 2005, provisional application No. 60/654,572, filed on Feb. 18, 2005.

(51) Int. Cl.
*G08B 1/08* (2006.01)

(52) U.S. Cl. .............................. 340/539.13; 340/572.1; 340/568.1

(58) Field of Classification Search ............. 340/572.1, 340/572.4, 568.1, 571, 539.11, 539.12, 539.13, 340/539.14, 539.15, 539.16, 573.1, 573.4, 340/10.1, 10.4
See application file for complete search history.

(56) References Cited

U.S. PATENT DOCUMENTS 5,854,825 A * 12/1998 Mukaihara et al. ......... 379/309
6,100,806 A * 8/2000 Gaukel ..................... 340/573.4
6,707,380 B2 * 3/2004 Maloney ................... 340/568.1
6,847,295 B1    1/2005 Taliaferro et al.
7,123,146 B1 * 10/2006 Holzman .................. 340/568.1
7,319,397 B2 * 1/2008 Chung et al. ............. 340/572.4

OTHER PUBLICATIONS

"AutoCorp—Homeland Security Network, Inc. Focusing on $22 Billion Global GPS Market"; http://biz.yahoo.com/pz/050224/73338.html?printer=1, Mar. 10, 2005, 3 pp.
"11,300 Laptops Left in Taxi Cabs!"; http://news.yahoo.com/news?tmpl=story&cid=2224&u=/prweb/20050223/bs_prweb/prwe...; Mar. 10, 2005, 2 pp.
"MedicAlert to Offer Wherify's GPS Locator Phone for Personal Safety"; http://biz.yahoo.com/bw/050106/65294_1.html?printer=1 Feb. 1, 2005, 3 pp.
"Security Getting Trampled in the Rush to RFID", http://news.yahoo.com/news?tmpl=story&cid=1738&u=/zd20050307/tc_zd/146782&prin...; Mar. 10, 2005, 3 pp.
"Beachhead Solutions Ships Version 1.0 of Lost Data Destruction Software"; http:/biz.yahoo.com/bw/050215/155158_1.html?printer=1, Feb. 17, 2005, 2 pp.

* cited by examiner

*Primary Examiner*—Van T. Trieu
(74) *Attorney, Agent, or Firm*—Pepper Hamilton LLP

(57) ABSTRACT

A tracking system includes a call handler and a database containing information relating to items to be tracked. The database contains customer identification criteria that guide the call handler to determine whether to track a tracked item for a customer. Communication nodes communicate with the customer, send a signal to a tracking device, receive a signal from the tracking device, and involve a law enforcement official in the communicating with the customer when appropriate.

4 Claims, 3 Drawing Sheets

TRACKING SYSTEM

RELATED APPLICATIONS AND CLAIM OF PRIORITY

This application claims priority to: (1) U.S. Provisional Patent Application No. 60/654,235 filed on 18 Feb. 2005, entitled "People Tracking System"; (2) U.S. Provisional Patent Application No. 60/654,236 filed on 18 Feb. 2005, entitled "Tracking System for Assets"; and (3) U.S. Provisional Patent Application No. 60/654,572 filed on 18 Feb. 2005, entitled "Animal Tracking System," each of which is incorporated herein by reference in its entirety.

TECHNICAL FIELD

The disclosure generally relates to tracking systems. More particularly, the invention relates to locating and retrieving missing or abducted/stolen assets, persons, or animals.

BACKGROUND

It is common for an owner of an asset such as a desktop or laptop computer, mobile phone, personal digital assistant (PDA), other electronic device, or even a briefcase or purse to lose the asset or have the asset stolen. When a lost or stolen asset such as a computer contains pertinent or confidential information, an owner often wishes to be able to locate and retrieve such asset immediately. The process of locating a lost or stolen asset that contains pertinent or confidential information may result in personal frustration, financial expense, and in the case of a corporate asset lost productivity as the asset's user requests and awaits a replacement. In addition, if the asset gets into the wrong hands, disclosure of confidential information and/or trade secrets may occur. The capability of locating a lost or stolen asset may be valuable to individuals, businesses, associations, schools, and even governments who store pertinent or confidential information on a personal computer (PC), laptop, server, PDA, cellular phone, or any device that could be stolen or lost.

In addition, a person may suffer great pain and sorrow if a loved one or pet runs away, is kidnapped or otherwise abducted, or is lost. For example, a child and the child's family may experience great tragedy if the child runs away or is abducted. A person with a mental disability may become disoriented or hurt if the person becomes lost and is not in familiar surroundings. When this situation occurs, a family member or caregiver wishes to be able to locate and have the person safely returned. However, no cost-effective method currently exists for tracking humans on a large geographic scale.

Most current tracking systems are used to track large, mobile assets such as an automobile. These tracking systems are neither feasible nor readily available to the public for the tracking of people, animals or small, portable mass quantity items such as a computer laptop or a briefcase containing important files. The current tracking systems do not adequately protect privacy and provide sufficient safety to be used for the automatic tracking of lost or abducted people. Furthermore, the current tracking systems are often used simply to help an individual locate an asset or areas near an asset, such as automobile global positioning systems that provide location-specific maps. These systems are not coordinated to prevent thefts and to locate and recover missing or stolen properties. Moreover, many of these tracking systems and services are not easily affordable to individual consumers or mass quantity purchasers such as corporate entities.

Exemplary existing tracking systems are described in U.S. patent application Ser. No. 10/926,203 by Contractor, with Publication No. 2005/0026629; U.S. patent application Ser. No. 10/843,203 by Holland et al. with Publication No. 2005/0026589; and U.S. patent application Ser. No. 10/858,758 by Boling et al., with Publication No. 2005/0026627, each of which is incorporated herein by reference in its entirety. However, each of these tracking systems have significant drawbacks.

The present embodiments are directed towards satisfying one or more of these problems.

SUMMARY

In an embodiment, a tracking system includes a call handler and a database containing information relating to items to be tracked. The database contains customer identification criteria that guides the call handler to determine whether to track a tracked item for a customer. Communication nodes communicate with the customer, send a signal to a tracking device, receive a signal from the tracking device, and involve a law enforcement official in the communicating with the customer.

The database contains information that guides the call handler to determine whether to involve a law enforcement official, whether to involve a supervisor; and whether, when tracking is initiated, to share a determined location of the item tracked with the customer when appropriate.

BRIEF DESCRIPTION OF THE DRAWINGS

The accompanying drawings, which are incorporated in and form a part of the specification, illustrate various embodiments and, together with the description, serve to explain the principles of the various embodiments.

DETAILED DESCRIPTION

As used herein, the term "asset" includes and is not limited to a thing such as an electronic device (e.g., laptop, PDA, phone, desktop computer), a vehicle (e.g., boat, car, truck, or other vehicle), a work of art or other rare article, museum pieces, or anything having a physical location that may be monitored with a tracking system.

As used herein, a "caller" refers to an individual who contacts a tracking service by any communication method, such as by a telephone call, a web-based inquiry, an e-mail exchange, and/or an in-person communication.

As used herein, a "customer" refers to a customer, subscriber or other authorized user of a tracking system and service. The customer may be, for example, a parent, relative or caregiver of a loved one who has a tracking device registered with the tracking system and service. It may also be an owner or lessee of an asset registered with the system and service. In some embodiments, the customer may include one or more authorized representatives of the customer, owner or lessee such as a spouse, attorney or even a trusted friend or co-worker.

As used herein, a "law enforcement official" includes any authority or entity that may assist in retrieving a lost or stolen person, animal or asset, such as one or more representatives of a police force, rescue service (e.g., fire, ambulance, paramedics), detective service, government agency, animal rescue organization, bodyguard service, security service or other entity.

As used herein, the term "trackable" means capable of being traced, monitored and/or tracked using a tracking system.

As used herein, the term "tracked item" means an asset, person or animal tracked using the embodiments described herein.

Figure 1:
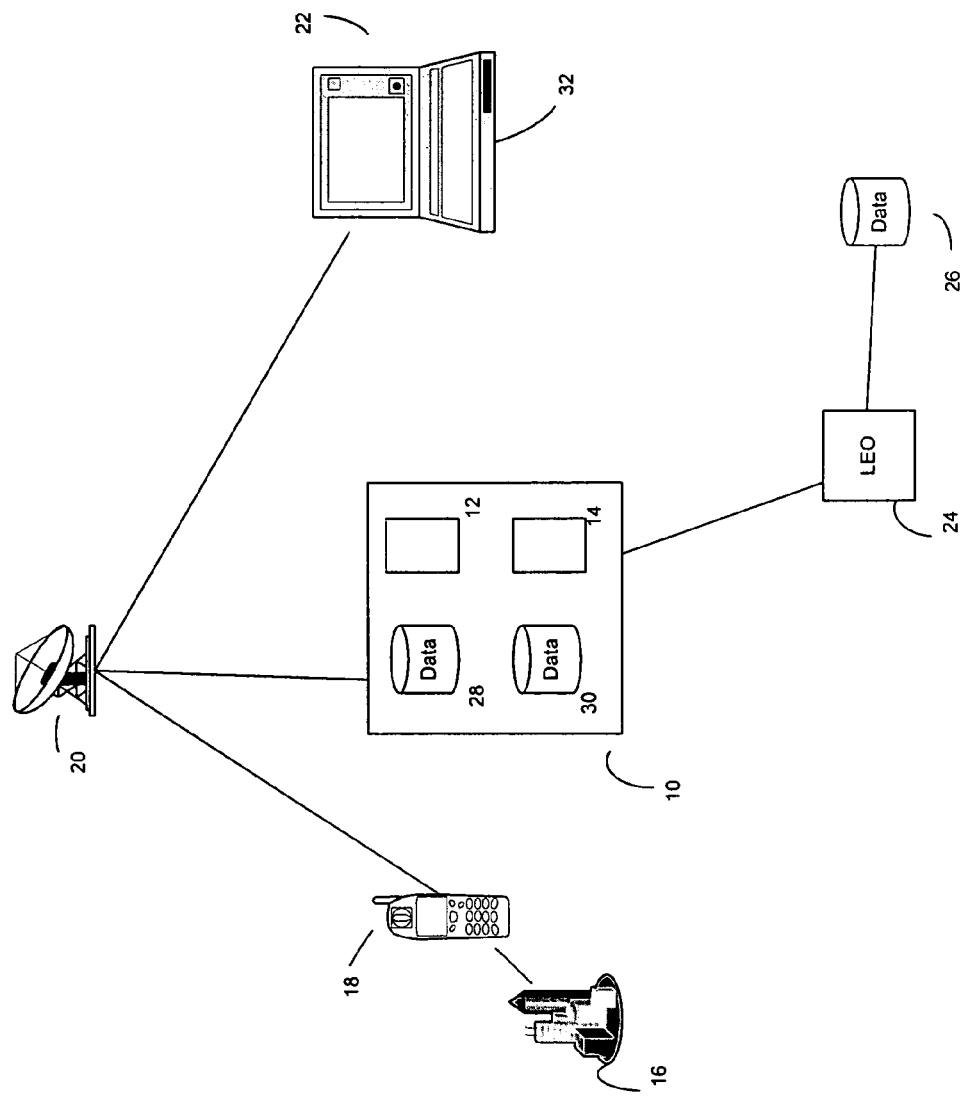
FIG. 1 is a block diagram illustrating exemplary features of a tracking system.

FIG. 1 illustrates various features of an exemplary tracking system. Referring to FIG. 1, a customer 16 may be in communication with a tracking service 10 via a communication system 20. In an embodiment, the communication system 20 may be a wireless and/or wired telephone system In other embodiments, the communication system 20 may include any suitable communication system, such as the Internet, a voice over Internet protocol (VOIP) system, satellite phone, global positioning system, or any other communication system. The customer 16 uses a communication device 18, such as a telephone, cellular phone, computer, PDA, walkie-talkie, or other communication device to communicate with the tracking service 10

The tracking service 10 also communicates with a communication system 20 that has geographic coverage over an area so that a person 22 within the area may be located. The communication system 20 may be the same system as the system that provides communication between the customer and the tracking service, or it may be a different service, or the systems may share some but not all features. In another embodiment the device could be subdermal.

The tracked item 22 is equipped with a tracking device 32 that is capable of receiving communications from the tracking service 10 and delivering communications to the tracking service 10 via the communication system 20. Exemplary tracking devices 32 may include, but are not limited to devices known to those skilled in the art and used in GPSs, RFID's (Radio Frequency Identification), cellular phones, other radio link and data acquisition and processing modules, or infrared or light-based systems. Exemplary devices may include those such as transponders and transceivers described in the following U.S. patents, each of which is incorporated herein by reference: U.S. Pat. No. 6,856,250 to Hillard and the patents listed therein; U.S. Pat. No. 6,856,578 to Magine et al.; U.S. Pat. No. 6,847,295 to Taliaferro et al.; U.S. Pat. No. 6,844,552 to Zhang et al.; and U.S. Pat. No. 6,842,121 to Tuttle. The device 32 may include some or all of the following features: small size, light weight, uniquely identifiable, adaptable to multiple persons, easily concealable, resistant to tampering and disablement, remotely activated from multiple locations, capable of emitting a "trackable" signal, waterproof and/or weather-resistant, capable of emitting a unique identification code or signal, capable of receiving a "wake up call" or instruction to emit a tracking signal, audio and/or video gathering or delivery capabilities, and/or inexpensive. In an embodiment, the tracking device may be made part of or attached to another device. For example, a tracking device for a person or animal may be installed in a wristwatch, ring, wrist or ankle bracelet, necklace or collar, or other wearable device or portable accessory such as a mobile phone or purse. As another exampled, a tracking device for a laptop computer may be integrated circuit that is installed on the motherboard or as an insert in order to make it more difficult for thieves or unauthorized individuals to locate the tracking device on an asset.

In an embodiment, the tracking device 32 may have low power usage in that at most times it may not transmit communications through the communication system 20. Rather, the tracking device 32 may only emit a signal at a predetermined time, such as a brief daily signal. Alternatively or in addition, the tracking device 32 may emit a signal only in response to a predetermined signal received from the tracking service 10. Because the tracking device 32 may not constantly emit signals at all times in this embodiment, the tracking device 32 may not require a large power source, and thus it may be made smaller and at a lower cost than devices that are always or substantially always on. The device 32 may also include features such as a sensor that may trigger an alarm or emit a signal if the device 32 is disengaged or removed from the human 22 such as by removal of the necklace or watch, and/or if the device 32 is low on power. To ensure that the device 32 is working properly and/or can receive and respond to a signal from the service 10, the service 10 may conduct periodic tests on a weekly, monthly, or quarterly basis by sending a test signal such as a "wake up call" or instruction to emit a signal to the device 32. Optionally, the tracking device may be configured to be inoperable if the tracking device is removed.

The service 10 may include a call handler 12, which may be a human or an automated response system that receives communications from a customer 16 and initiates the delivery of communications to and search for communications from a tracking device. The service 10 may also include a supervisor 14 who may monitor activities of a call handler 12 and/or performed supervisory activities such as those listed below. The service 12 may include one or more databases 28, 30, which may contain information such as customer information, information about registered tracked items, and/or other information. The service may also be in communication with a law enforcement officer (LEO) 24. The LEO 24 may be a police officer, dispatcher, private detective, bounty hunter, animal control representative or other individual service who is available and willing to help recover a lost or missing person. The communication system between the service 10 and LEO 24 may be the same system as the system that provides communication between the customer and the tracking service, or it may be a different service, or the systems may share some but not all features.

Figure 2:
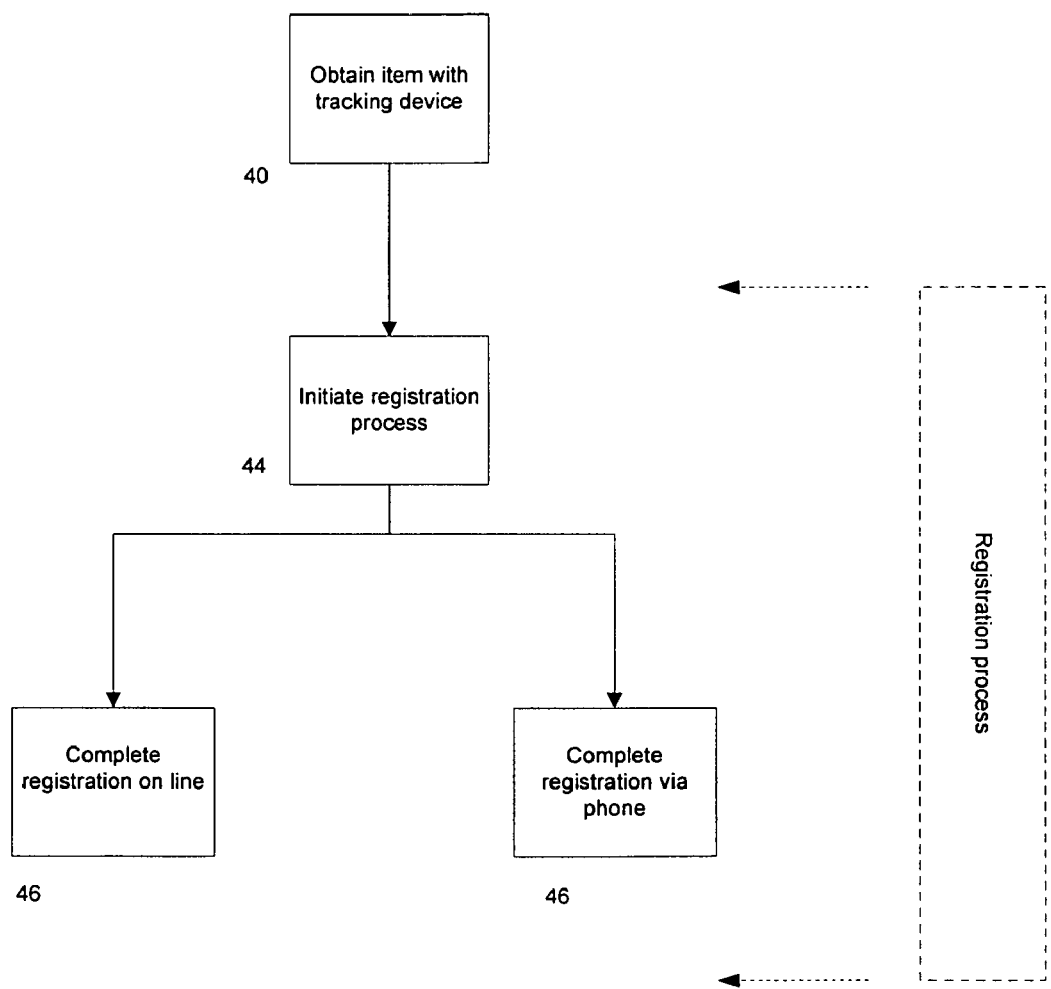
FIG. 2 depicts an overview of an exemplary customer's registration process of a tracking system and service.

FIG. 2 illustrates an example of a customer's registration process of a tracking system and service. Referring to FIG. 2, in an embodiment a customer may purchase or otherwise receive an item that includes, or an authorized dealer may install, a tracking device onto an item 40. The seller, customer or installer may initiate a registration process 42. In an embodiment, the registration process may include, for example, the customer's or other user's identification such as a name, identification number or other reference. If the tracked item is a person or animal, the information also may include the name and/or other information relating to the person who will wear the tracking device. In addition, information pertaining to an identification of an owner(s) or other individual who may be permitted to track the equipment may be entered into the tracking system and service's database. Such information may include, for example, address of owner(s), a phone contact number(s), the serial number or other identifier of the equipment purchased, and the serial number or other identifier of the tracking device.

The method may also include allowing the customer to set up the remainder of his or her account by providing data such as billing address and/or method of payment. In alternate embodiments, the tracking device may be pre-registered and sold to a customer in pre-registered form with predetermined access codes.

At the point of sale or installation, or later if the customer desires, the customer may complete registration with the tracking service via any appropriate communication medium, for example, either on-line 46 or by calling the tracking service directly 48. Other methods of completing registration, such as in-person registration, are possible. In completing registration, in an embodiment the customer must provide an identifier such as a password and/or the last four digits of the customer's social security number, a tax identification number, or a corporate account identification number. The customer may also be required to provide answers to one or more, and preferably at least two, questions for which only the customer knows the answers. Such questions may include, for example, a mother's maiden name, a hometown, or the name of a pet. The registration may also include requiring the customer to agree to specified terms and conditions of use.

Figure 3:
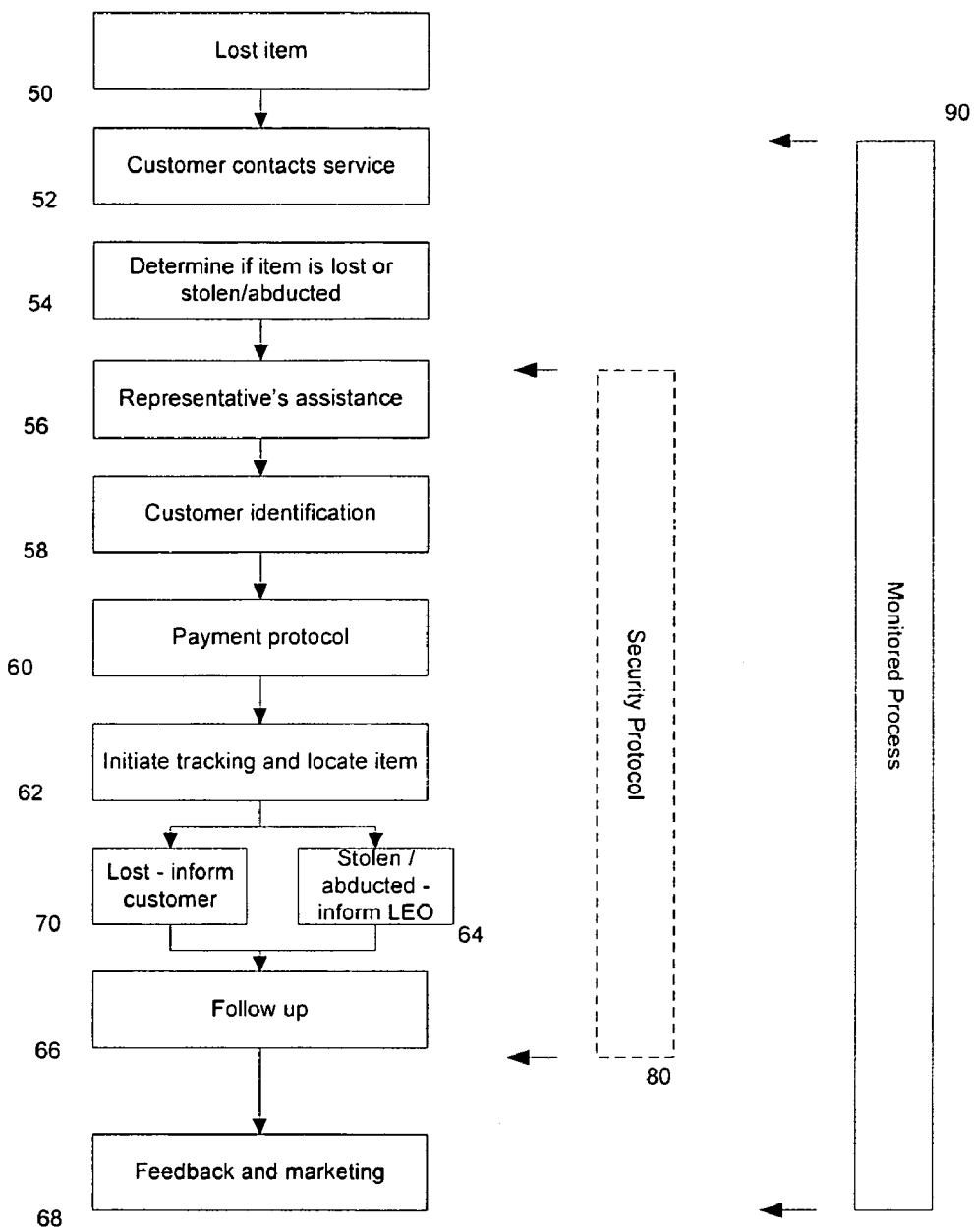
FIG. 3 depicts a block diagram of an exemplary retrieval protocol of a system and service for tracking and retrieving a missing person, animal or item.

FIG. 3 illustrates a block diagram of a retrieval protocol for tracking and retrieving a tracked item. When a tracked item is missing, lost or stolen 50, the customer may contact 52 the service to locate the tracked item. The contact is preferably initiated by a wireless, wired or VOIP phone, although other methods of contact, such as Internet-based contact or in-person contact, are possible. Optionally, the service will respond promptly or immediately and the call handler or other representative of the service may ask the caller if the tracked item is known to be abducted or stolen or is simply lost 54. Optionally, initial call handling may be handled by an automated system, such as a touch-tone or voice prompt, before the caller is routed to an appropriate representative 56 to assist the caller, or the person who initially answers may provide the assistance.

The representative may ask the caller pertinent information and enter it into a tracking terminal, such as a computer or dumb terminal or PDA connect to a database 58. The information may include, for example: (1) caller's name and address of the tracked item or its owner (if applicable); (2) an identifier such as the last four digits of the caller's social security, tax identification number, or a corporate account identification number; and/or (3) answers to the question or questions provided during the registration process 42. This information may be checked against a database to verify that the caller is a customer or subscriber of the service and/or is the owner or authorized retriever of the tracked item. Referring to FIG. 1, the database 28 may contain data such as: name of individuals who are permitted to track the tracked item, address of the authorized representatives, phone contact number(s), name, serial number or other unique identifier of the person to be tracked, a tracking device serial number or other identifier; a user identifier such as the last four digits of the owner's social security or tax identification number; and answers to proprietary questions. The same database 28 or a different database may also contain information about callers and/or persons for whom a flag or alert will be triggered if a corresponding call or tracking device signal comes in to the tracking system. The caller's information may also be entered into a second database or computer memory area 38 to maintain a record of the call. Other customer identification methods may include biometric identification such as voice recognition, retina scan, fingerprinting, etc. Any of these methods may be done electronically via a communication system in certain embodiments.

If the caller's identification is verified, optionally the call handler or representative may then determine how the caller/customer desires to pay for the tracking service 60. A mere subscription to the tracking service may be at no cost to the customer. In an embodiment, the customer may only need to pay for services that are provided—for example, on a "pay per call" basis. Such services may include tracking a person, retrieving a person, and/or monitoring the whereabouts of a person. The customer may pay for such services via a credit card, funds held account or other payment method, which optionally may be set up during the registration process 42. If the customer entered a credit card for payment at registration, payment may be transacted automatically on that credit card, or the representative may ask if the customer wishes to use that card. If the card has expired, that fact may be shown on a tracking terminal or otherwise made known to the representative, and the representative may ask for replacement information. If the customer wishes to use another card, that information may have to be provided to the representative.

Optionally, the system may require a customer who has no valid payment information on record to deliver payment, such as in person or via overnight delivery, before the tracking service is provided. Optionally, the representative may notify the customer that tracking will be available for a limited period or on a limited basis (such as periodically for a time period, such as up to about 48 hours,) while allowing the customer time to send payment. If the item is stolen, optionally the representative may obtain the customer's recorded, verbal agreement or other agreement (such as e-mail or fax agreement) to pay the tracking charges and provide an address for the invoice. The representative may add this information to the tracking terminal.

If any customer information does not match information contained in the customer database 28, or if the customer information meets any predetermined alert criteria (such as inclusion on a known database of criminals or stolen credit cards, or predetermined payment procedures), the call handler may be provided with an alert to follow a Supervisor-Notification/Limited-Information-Only Protocol. (an embodiment of which is described in more detail below). The representative may or may not advise the caller of this fact. Optionally, the representative may ask if the caller for additional information that, if correctly received, will negate applicability of the Supervisor-Notification/Limited-Information-Only Protocol.

Under a Supervisor-Notification/Limited-Information-Only Protocol, representatives, supervisors, and others involved in the contact may be alerted as to the status of the call. Under such a protocol, the call handler may be instructed, for example, to ensure that the caller is not provided with the exact location of the device. In addition, the flag may trigger the involvement of law enforcement, supervisors or others to locate and retrieve the missing person.

If the caller cannot provide the necessary identification information, then the call handler may optionally refuse to provide the service and/or involve a supervisor and/or law enforcement officer. Optionally, the call handler may be permitted to use his or her judgment, and/or the call handler may be required to follow rules or guidelines, in these situations to determine whether or not to permit tracking. The representative may have several courses of action to take depending on the circumstances surrounding the call.

For example, if the caller is not a customer but is someone who may have a reasonable purpose to track the tracked item, the representative may optionally put the caller on hold and contact the registered customer, such as by calling the customer's phone number(s) in the database. Another situation that may occur is where the caller is not able to produce accurate information within two attempts, but the representative believes the caller may still be a customer, the representative may employ a Supervisor-Notification/Limited-Information-Only Protocol, or the Supervisor-Notification/Law-Enforcement-Only Protocol. For example, if a spouse or, in the case of a corporate account, a senior officer of a company, were calling on behalf of a customer who is ill, the above steps or other procedures may be employed by the representative. In such a case, law one or more of the protocols described herein may be triggered.

The Supervisor Notification/Limited-Information-Only Protocol (SN/LIO) and the Supervisor Notification/Law-Enforcement-Only Protocol (SN/LEO) represent exemplary steps that may be taken by the tracking service when a suspicious activity or activities such as a false identification by the caller or an unusual call regarding a person occur. Such activities may suggest, for example, that the tracking device is being misused or that the person is in danger, and thus additional scrutiny and faster response, such as the immediate dispatch of a law enforcement official, may be warranted. When SN/LIO is triggered, a supervisor may be notified to monitor the call and/or the representative may only provide the caller with limited information such as the proximity of the tracked person in relation to the location of the caller. When SN/LEO occurs, a supervisor and/or a law enforcement official may be involved.

SN/LIO may be triggered when certain suspicious events or conditions occur. A suspicious condition that may trigger SN/LIO may be a situation where an item is lost and any of the following occurs: a caller can provide most but not all complete and accurate identification information; an attempt to assign a tracking device; a billing protocol is not followed; the representative believes the SN/LIO Protocol may be necessary; or a Limited-Information-Only Flag has been set in the database and is displaying on the customer's account.

Supervisor Notification/Limited Information Protocol: When SN/LIO is triggered, the representative may notify a supervisor. The representative may also notify the caller/customer for their protection that: a supervisor is now monitoring the call (and every caller may have already been told by the tracking service's automated answering system that the call may be monitored); the tracking service may track the item, but may only be able to provide limited information. The caller may have to confirm his or her present location. The representative may inform the caller if the tracked item is nearby. If the tracked item is not near the caller's current location, the representative may ask the caller where the person may located. If the caller identifies the location where person currently is, the representative may affirm that is where the tracking device is currently located. However, preferably the representative does not independently offer the location of the device to the caller.

If the caller is unable to offer a location where the tracked item is currently located, the representative may ask if the caller prefers the representative to notify a law enforcement official near the caller.

Law Enforcement Protocol: A Supervisor Notification/Law-Enforcement-Only Protocol (SN/LEO) may be triggered in several situations such as the following: the representative believes the caller may not be an actual customer; the representative believes the caller may not be trying to locate the person for a lawful purpose; the representative believes the SN/LEO Protocol may be necessary; or a Law-Enforcement-Only Flag has been set in the database and is displaying on the customer's account.

If SN/LEO is triggered, the representative may notify a supervisor. The representative may notify the caller/customer that a supervisor may be monitoring the call, and the representative may track the tracked item but may only provide the location to a law enforcement official. The customer may need to work through her law enforcement official in retrieving the tracked item. The representative may assist the caller in identifying a local law enforcement official, enter this information in the tracking terminal, put the customer on hold while the item is being tracked and contact that law enforcement office. The representative may provide the caller with the name of the local law enforcement officer who may handle the caller's case and the law enforcement official's phone number, e-mail address or other contact information so the caller can immediately contact the official.

After the relevant protocols have been followed and the customer's identification is verified, the representative may initiate the tracking 62 of the tracked item. Once the tracked item is located, if no flags have been triggered the representative may inform the caller of its location if the person is reported lost 70. Optionally, a law enforcement official may need to be involved in every call or promptly if predetermined conditions exist. The representative may determine with the caller who their local law enforcement office is and initiate a conference call with that office.

Referring again to FIG. 1, the tracking may occur by having the tracking service 10 send a signal via a communication network 20 to an area where the tracked item 22 may be located. When the signal is received by the tracking device 32, the tracking device may return a "trackable" signal to the tracking service 10. The "trackable" signal may be delivered in any known manner, such as those available in GPS systems, to permit determination of the location of the tracking device 32.

When SN/LIO and/or SN/LEO are triggered, or when there is an occurrence of any other suspicious activity such as an unusual call or a large volume of calls regarding a person, an additional monitoring step may be taken. Such an additional step may involve a supervisor constantly monitoring or tracking an item, and/or it may involve a law enforcement official being notified of the suspicious activity. Furthermore, the tracking service may have an automatic link from its database to the law enforcement offices to automatically alert or notify the offices should a suspicious activity occur. Such a database, as illustrated in FIG. 1 as item 26, may include a database of known criminals. In embodiments where the service is able to access and/or receive information from the law enforcement database 26, calls from individuals in the database may trigger one or more of the protocols described above.

Optionally, the tracking service may also maintain a database of contact information for law enforcement officials. For example, it may have contact information for Local Police, State Police, Constable and/or Sheriff offices throughout a geographic area, such as all or part of North and South America. The tracking service may work with law enforcement to track and locate missing persons. For example, when the service locates a person by receiving a communication from a tracking device, the service may request that a law enforcement official be dispatched to the location.

Returning to FIG. 3, as part of a security protocol 80 for the tracking service, a representative may make a follow-up contact 66 to the customer or to another within a time period, such as twenty-four hours, of a tracking event to help ensure customer satisfaction. The representative may ask the customer one or more questions for feedback 68. The questions may include, for example: Was the person recovered? If the person was not recovered, why? Was the person hurt, and if so, how? If applicable, on a scale of 1-5 (with 1 meaning extremely helpful and 5 meaning not-at-all), was the law enforcement office helpful? On a scale of 1-5 (with 1 meaning extremely helpful and 5 meaning not-at-all) was the tracking system and service helpful? Would the Customer like additional information e-mailed to her regarding the tracking service's other products that use tracking technology and service? Does the Customer have any suggestions for improving the products or services? Does the Customer have any further comments she would like to offer? If comments are positive, ask if they may be used in tracking service's marketing materials. Lastly, the representative may thank the customer and assure her that the tracking service will be there to provide assistance for her in the future. Based on the follow-up and/or feedback 68, the customer may, either on the call or at a later time, be offered additional goods, services or marketing opportunities.

In an embodiment, all or substantially all calls to and from the tracking service may be monitored and recorded by the service. For example, all telephone numbers dialed into and by the service may be recorded by the service. All calls made and received by an employee of the service on the service's telephone system may be recorded and monitored. This may allow the service to determine the number of calls received from a specific customer, relating to a specific person or tracked item, and/or to a particular employee during a time period. For example, if the service were to determine that a relatively large number of calls relating to a person were being received in a time period, the SN/LIO protocol or another protocol may be triggered to determine whether fraud may be occurring. Similarly, if the system may "track the trackers" by monitoring employee activity and triggering SN/LIO or other monitoring or response if an employee were engaged in suspicious activity (such as if a particular employee were to receive a large number of calls from one caller, or to make a large number of calls to a particular phone number) over a predetermined period.

A periodic statement of all activities including calls, services requested by a customer, and/or services provided by the tracking service on an account may be sent out to the customer every month, quarter, or year. Such a statement may be delivered in hard copy and/or electronically. In addition, such activity may be available via phone, Internet, or otherwise on-demand when the customer requests it and verifies his or her identity.

In an embodiment, the tracking devices may not be permitted to be assigned. In other embodiments, the customer may register an assignment of a tracking device by accessing the system and proceeding through a security protocol. The customer may also visit an authorized dealer, present appropriate identification, and register an assignment in person. The assignment will relate the tracking device to a different customer for future tracking. If a tracking event were to occur within a predetermined time period, such as thirty (30) days of a transfer, the service may check with a prior owner to determine if the assignment was illegal, unauthorized or otherwise problematic.

Optionally, the customer may be an organization, such as a hospital, jail or other organization that tracks multiple individuals. In such an embodiment, a designated corporate representative may be given a password and/or other identifier that allows the corporation to change the association of users and persons, and/or modify the database to add and/or delete customers and persons as individuals change positions, join and leave the corporation.

In embodiments where the tracked item is a person or animal, a necklace, ring, collar, bracelet or other item that contains a tracking device registered with the tracking system and service may have a label, plate, tag or sticker or other identifier that indicates that the device is registered with the service. Such a label or tag may help to facilitate faster retrieval of a person, as someone may find a person and call in to the service even before the customer realizes that the person is missing. In an embodiment, such contacts may be free of charge to customers and the public.

It is to be understood that the present invention is not limited in its application to the arrangement set forth in this description or illustrated in the drawings. The invention is capable of other embodiments and of being practiced and carried out in various ways. As such, it is important that the description be regarded as including all equivalent constructions that do not depart from the spirit and scope of the present invention.

What is claimed is:

1. A tracking system, comprising:
   a call handler;
   a database containing information relating to items to be tracked, wherein the database contains customer identification criteria that guide the call handler to determine whether to track a tracked item for a customer;
   a communication node for communicating with the customer;
   a communication node for sending a signal to a tracking device;
   a communication node for receiving a signal from the tracking device;
   a communication node for involving a law enforcement official in the communicating with the customer.

2. The system of claim 1, wherein the database contains information that guides the call handler to determine whether to involve a law enforcement official.

3. The system of claim 1, wherein the database contains information that guides the call handler to determine whether to involve a supervisor.

4. The system of claim 1, wherein the database contains information that guides the call handler to determine whether, when tracking is initiated, to share a determined location of the tracked item with the customer.

* * * * *